Figure 1:
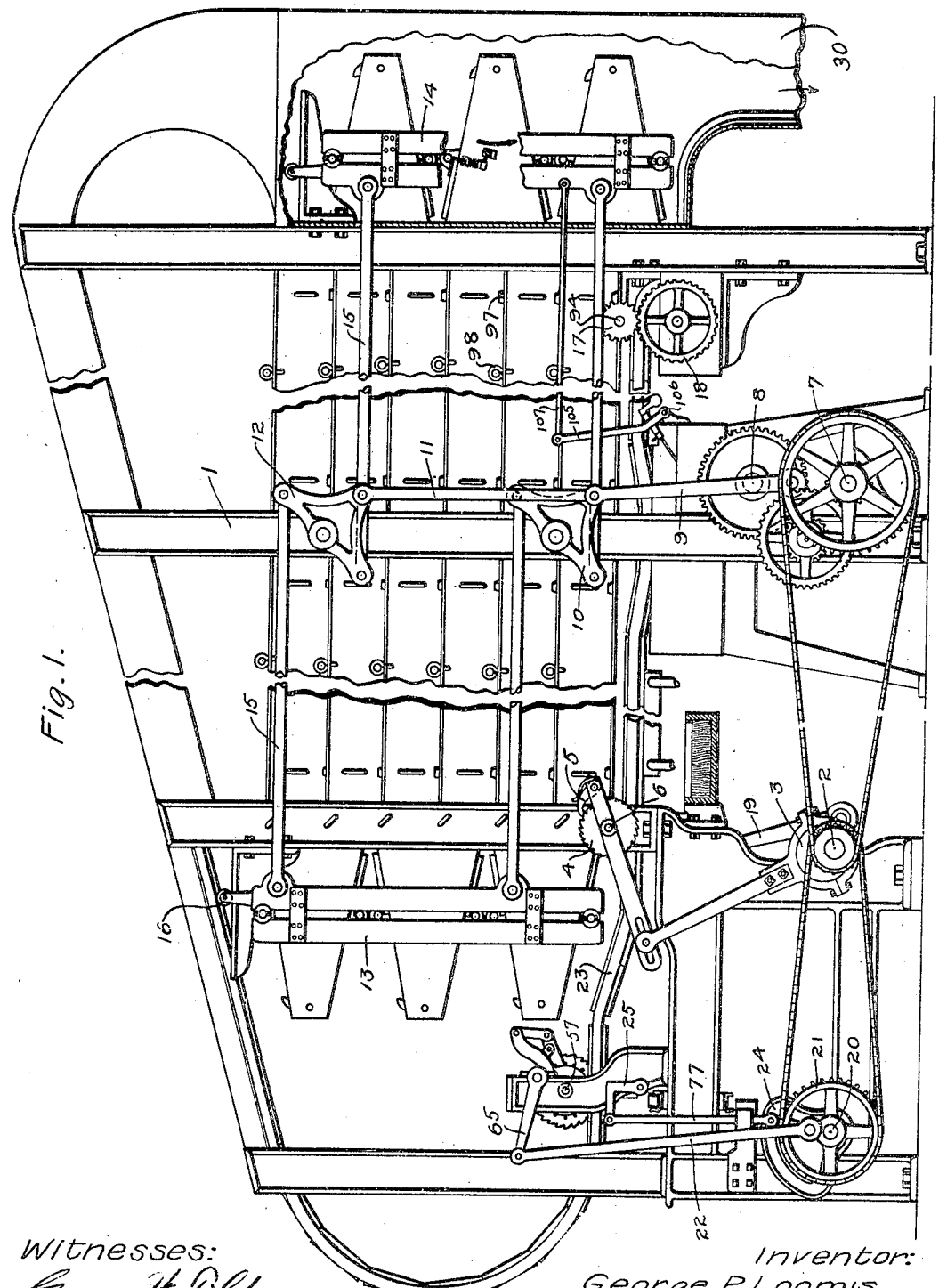

No. 808,767. PATENTED JAN. 2, 1906.
G. P. LOOMIS.
AUTOMATIC MATCH MAKING MACHINE.
APPLICATION FILED MAR. 18, 1905.

6 SHEETS—SHEET 1.

Witnesses:
George H. Tilden.
Edward Williams, Jr.

Inventor:
George P. Loomis.
By Alex. F. Macdonald.
Att'y.

No. 808,767. PATENTED JAN. 2, 1906.
G. P. LOOMIS.
AUTOMATIC MATCH MAKING MACHINE.
APPLICATION FILED MAR. 18, 1905.

6 SHEETS—SHEET 3.

Witnesses:
George W. Tilden
Edward Williams, Jr.

Inventor:
George P. Loomis.
BY Alex F. Macdonald.
Att'y.

No. 808,767.  
PATENTED JAN. 2, 1906.  
G. P. LOOMIS.  
AUTOMATIC MATCH MAKING MACHINE.  
APPLICATION FILED MAR. 18, 1905.  
6 SHEETS—SHEET 4.
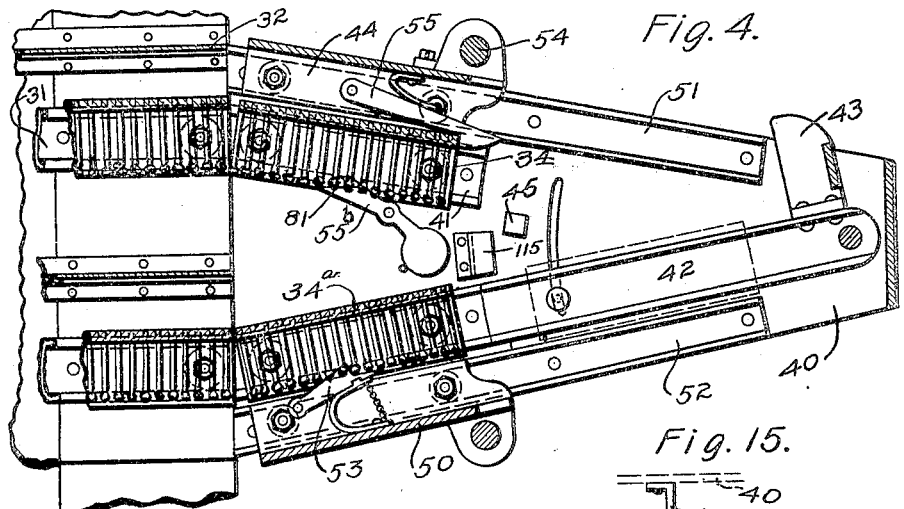
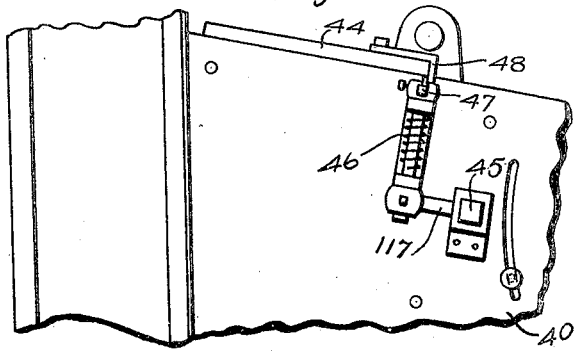
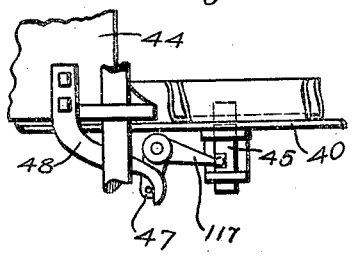
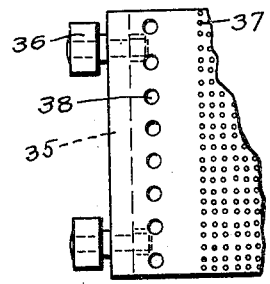
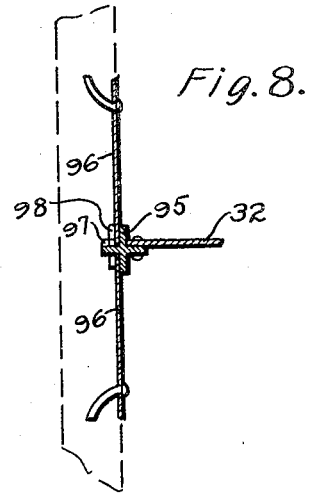
Witnesses:  
George H. Tilden.  
Edward Williams, Jr.
Inventor:  
George P. Loomis:  
By Alex F. Macdonald.  
Att'y.

No. 808,767. PATENTED JAN. 2, 1906.
G. P. LOOMIS.
AUTOMATIC MATCH MAKING MACHINE.
APPLICATION FILED MAR. 18, 1905.
6 SHEETS—SHEET 5.
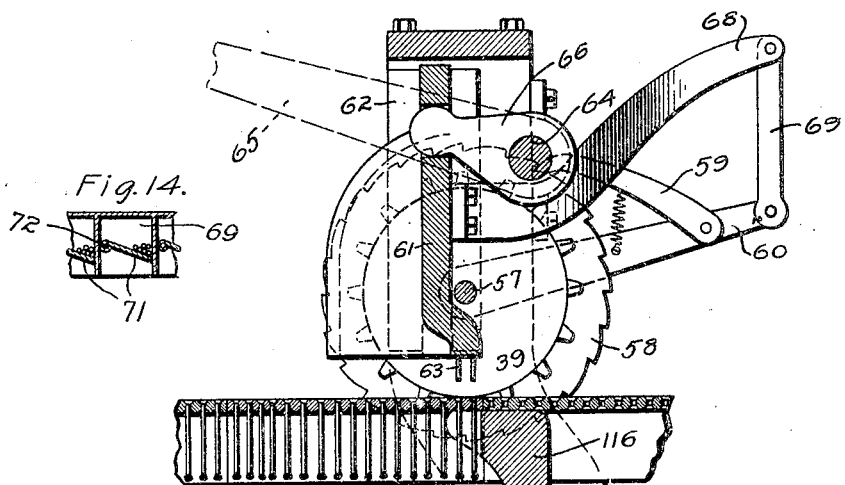
Fig. 9.
Fig. 14.
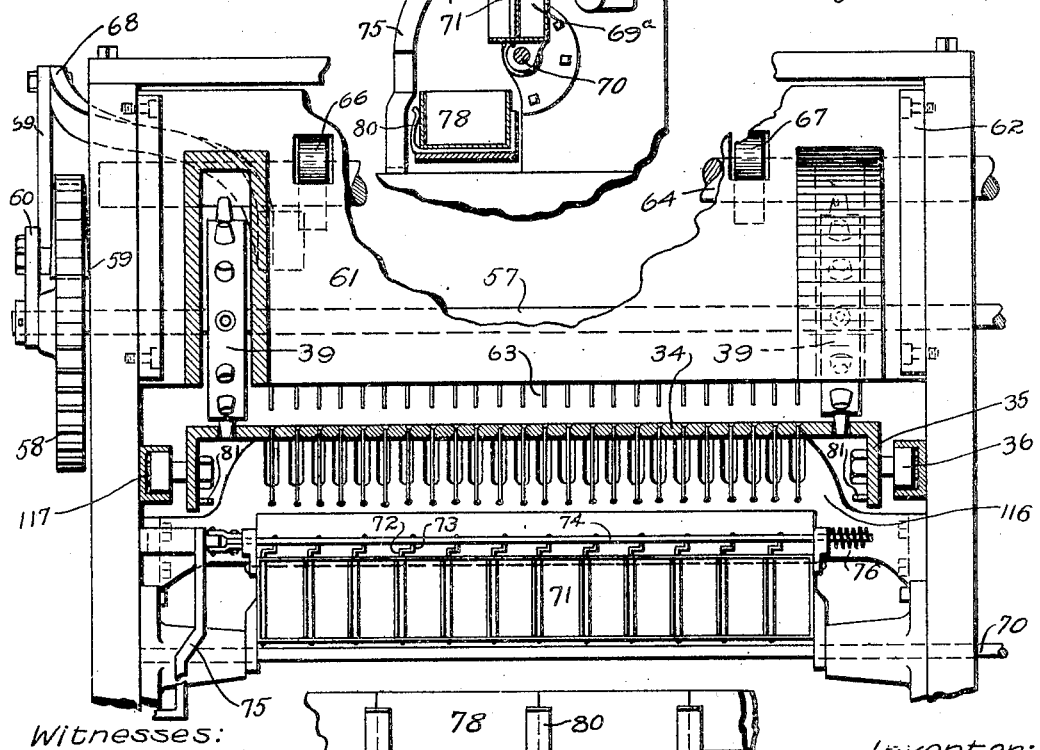
Fig. 10.
Fig. 13.
Witnesses:
Inventor:
George P. Loomis.
By Alex F. Macdonald
Att'y.

No. 808,767. PATENTED JAN. 2, 1906.
G. P. LOOMIS.
AUTOMATIC MATCH MAKING MACHINE.
APPLICATION FILED MAR. 18, 1905.
6 SHEETS—SHEET 6.
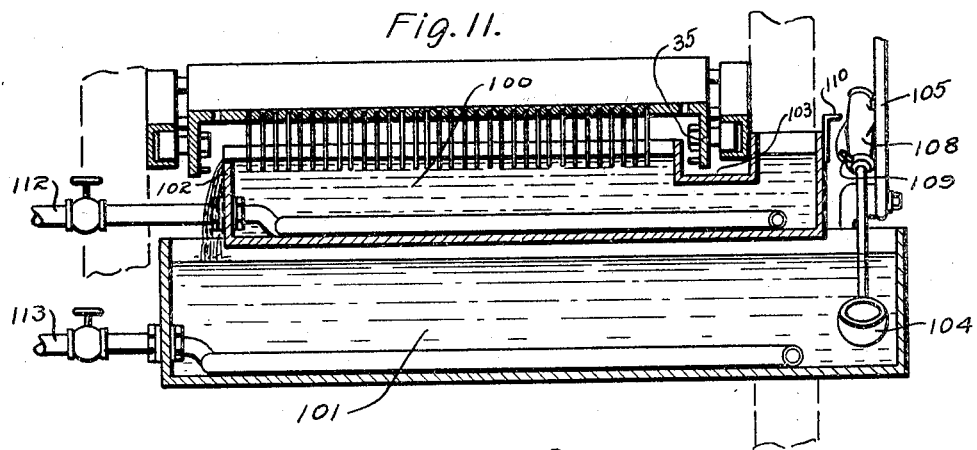
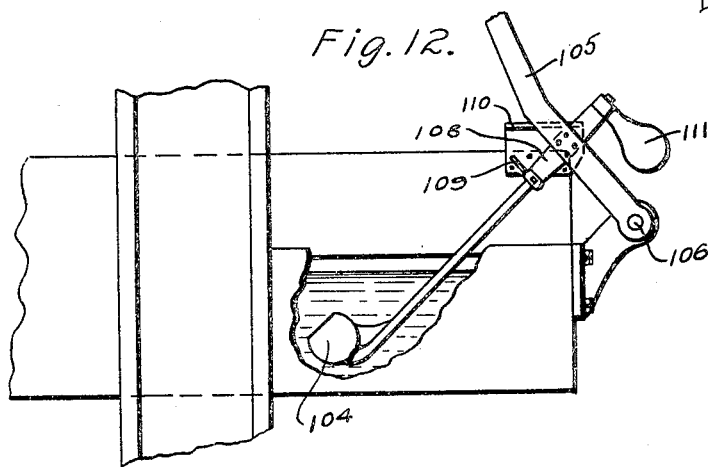
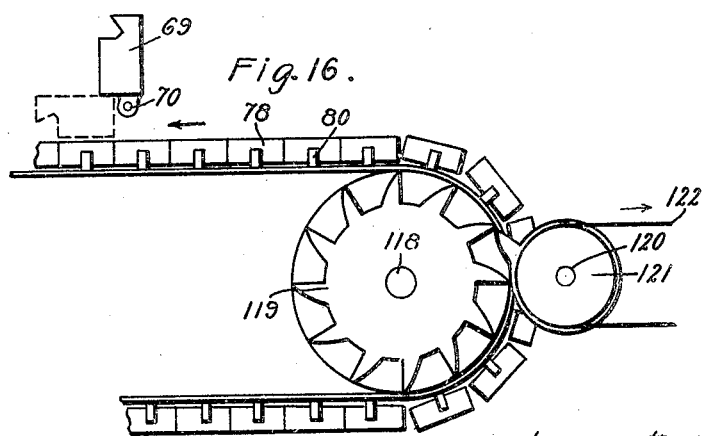
Witnesses:
George H. Tilden.
Edward Williams, Jr.
Inventor:
George P. Loomis.
By Alex F. Macdonald.
Att'y.

UNITED STATES PATENT OFFICE.

GEORGE P. LOOMIS, OF SCHENECTADY, NEW YORK.

AUTOMATIC MATCH-MAKING MACHINE.

No. 808,767.           Specification of Letters Patent.           Patented Jan. 2, 1906.

Application filed March 18, 1905. Serial No. 250,788.

*To all whom it may concern:*

Be it known that I, GEORGE P. LOOMIS, a citizen of the United States, residing at Schenectady, in the county of Schenectady, State of New York, have invented certain new and useful Improvements in Automatic Match-Making Machines, of which the following is a specification.

The present invention relates to match-making machines, and has for its object to provide a machine which is automatic in its action, occupies a minimum amount of floor-space, and is capable of turning out a very large number of finished matches for a given unit of time.

In carrying out my invention a suitable frame is provided, and mounted thereon and extending parallel or substantially so with the base are track-sections, over which the match holders or carriers move during the process of manufacture. These track-sections are located one above the other and are suitably spaced apart. In order to transfer the match-holders from one track-section to another and at the same time to maintain the heads of the matches in their downward position, so that they will be uniform in shape, transfer devices are provided which are located at opposite ends of the track-sections. These transfer devices include a pivoted carriage so constructed and arranged that it will transfer the match-holders one by one from one track-section to another. By reason of this construction as many track-sections may be provided as are desired. The transfer devices located at opposite ends of the machine and in staggered relation to each other are simultaneously operated through suitable connections by the main driving-shaft. Each track-section receives the holders at one end and delivers them at the other. From this it follows that the path of a given holder is a zigzag one. In other words, on one track-section the holder moves to the right. Then it is transferred to another section immediately above it, upon which it moves to the left. This action is repeated until the matches are completely cured.

I prefer to have the holders move from the bottom of the machine to the top; but they may move from the top to the bottom. In the latter case the arrangement of the cutters, feeding devices, &c., would be correspondingly altered.

When the holders arrive at the end of the last track-section, they are taken by a conveyer and returned to the point of starting—*i. e.*, the place where the match-sticks are inserted in the holders. As the holders move along the conveyer the matches contained therein are discharged by means of suitable devices into hoppers, the latter being located directly over the match-receiving boxes carried by a suitable conveyer. The hoppers are moved at stated intervals to discharge their contents, after which they are returned to their normal position. The match-sticks are formed by suitable cutters and are inserted in the carriers as soon as they are formed. The particular construction of the cutter can be varied without departing from the spirit of my invention.

The holders are similar in construction, each having the desired number of holes to receive the match-sticks. They normally engage one with the other by end-to-end contact and while on the first track-section, where the paraffin and ignition-paste or composition are applied to the ends of the match-sticks, are fed along in a step-by-step manner by a ratchet-and-pawl feed, each step representing the pitch distance between match-containing holes in the holders. After the holders leave the first or lower section in the present case the feeding is accomplished by the same means that actuate the transfer devices. Here the feed is step by step, as before; but the length of the step corresponds to the length of a holder. The two feeding devices are so timed, however, that the transfer devices operate only after the first-mentioned feeding device has delivered a holder thereto. This arrangement prevents the independent feeding devices from interfering with each other.

In order to quickly dry or cure the matches after the ignition paste or composition has been applied thereto, a current of air or other drying medium is passed around the holders. This may be due to a blast or to an exhaust-fan. The latter arrangement is preferred, because the fumes can be discharged out of the room containing the machine into the open air. The machine is inclosed by a suitable casing, such as sheet-iron, except at one end or other suitable point where the air is admitted.

If the current of air through the machine was of the same strength at all points, it would have to be so regulated that it would not cause the composition on the matches freshly treated to flow to one side, and thus form an uneven or irregular head. After the matches have dried somewhat, however, this danger does not exist. In order, therefore, to obtain the best results and to dry or cure the matches as quickly as possible, so that the number of matches finished per unit of time is a maximum with a machine of minimum size and number of holders, I separate each track-section from those adjacent to it by suitable partitions. In this manner a number of chambers are formed which receive air from the same source and discharge it in multiple into the receiving-conduit of the exhaust-fan. The passage of air through each of these chambers is controlled by a damper, so that the amount can be regulated to suit the conditions. In the early stages of manufacture the flow of air should be comparatively small, but as the match-heads become firmer the amount should be increased until a substantial amount of air is passing through the chambers. Successively increasing the volume of air passing over the match-heads adds greatly to the capacity of the machine and is therefore a most important consideration.

Those transfer devices located at the point of opening in the inclosing casing are so situated that the operator can see the holders and matches and tell at a glance whether or not the machine is working properly.

Instead of locating each track-section in a separate inclosure I may locate two or even more of them in the same chamber; but care should be exercised to arrange the parts so that the current of air acting on the match-heads in the early stage is less than in the later stages.

The chambers are so constructed and arranged that there are no vertical passages through which fire can creep from one to another. Each chamber is provided with a nozzle through which steam or other media may be discharged to put out any fire which may occur. The plates forming the sides of the chambers are removable to permit inspection of the interior of any portion of the chambers.

The coating of the match-sticks with paraffin or equivalent material requires that the level of the liquid in the tank be maintained constant. This I accomplish by means of an automatic device which continually supplies an excess of the fluid and permits it to flow over a dam located at a predetermined height. The ignition paste or composition is applied to the ends of the match-sticks by a roller located in a tank, the latter being supplied by a suitable source.

In order to heat the ends of the match-sticks preparatory to dipping them in the paraffin and also to heat the paraffin itself, steam-coils are provided which may be connected with the same source of pressure as the fire-nozzles.

Figure 2:
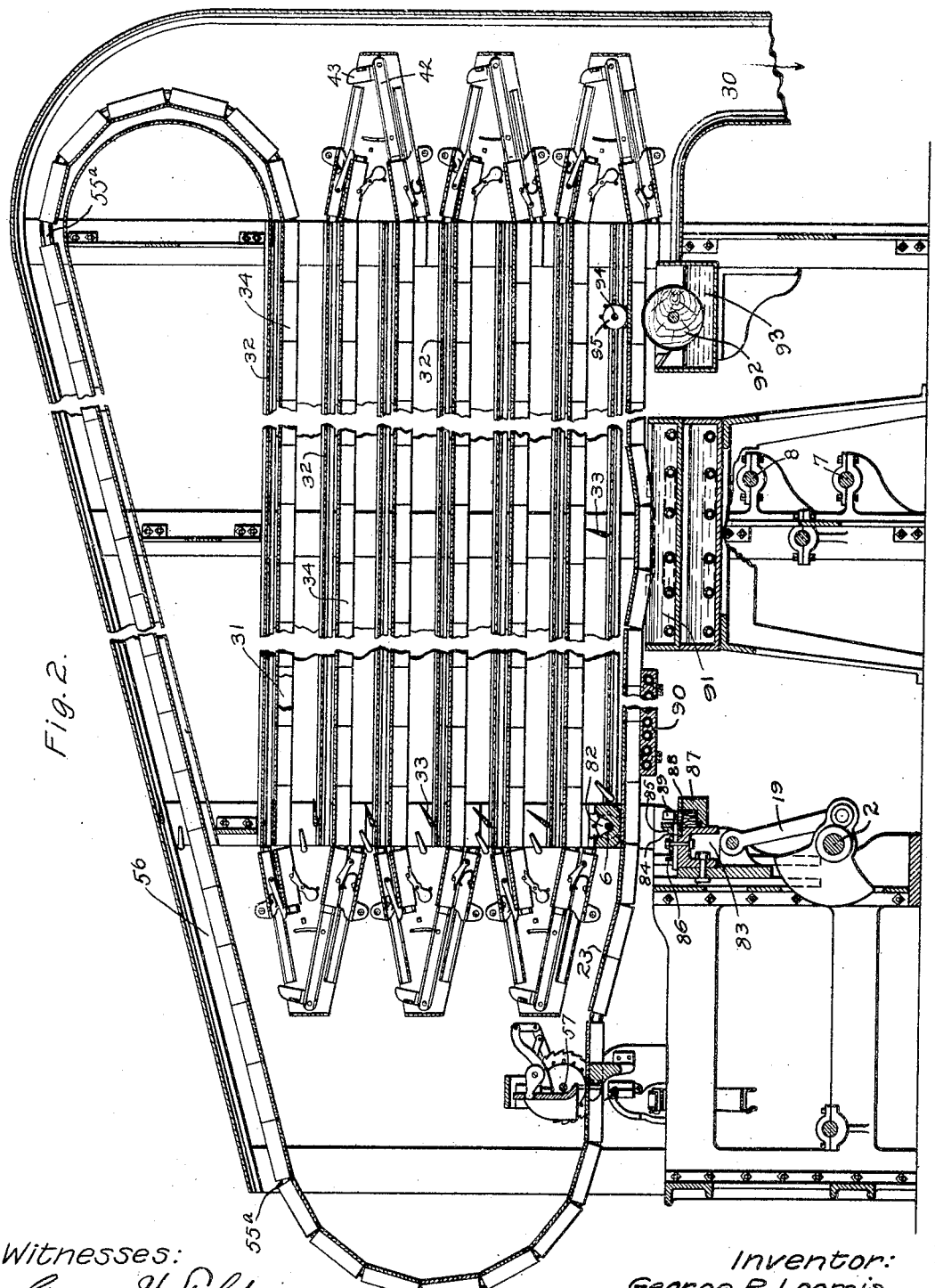
Figure 3:
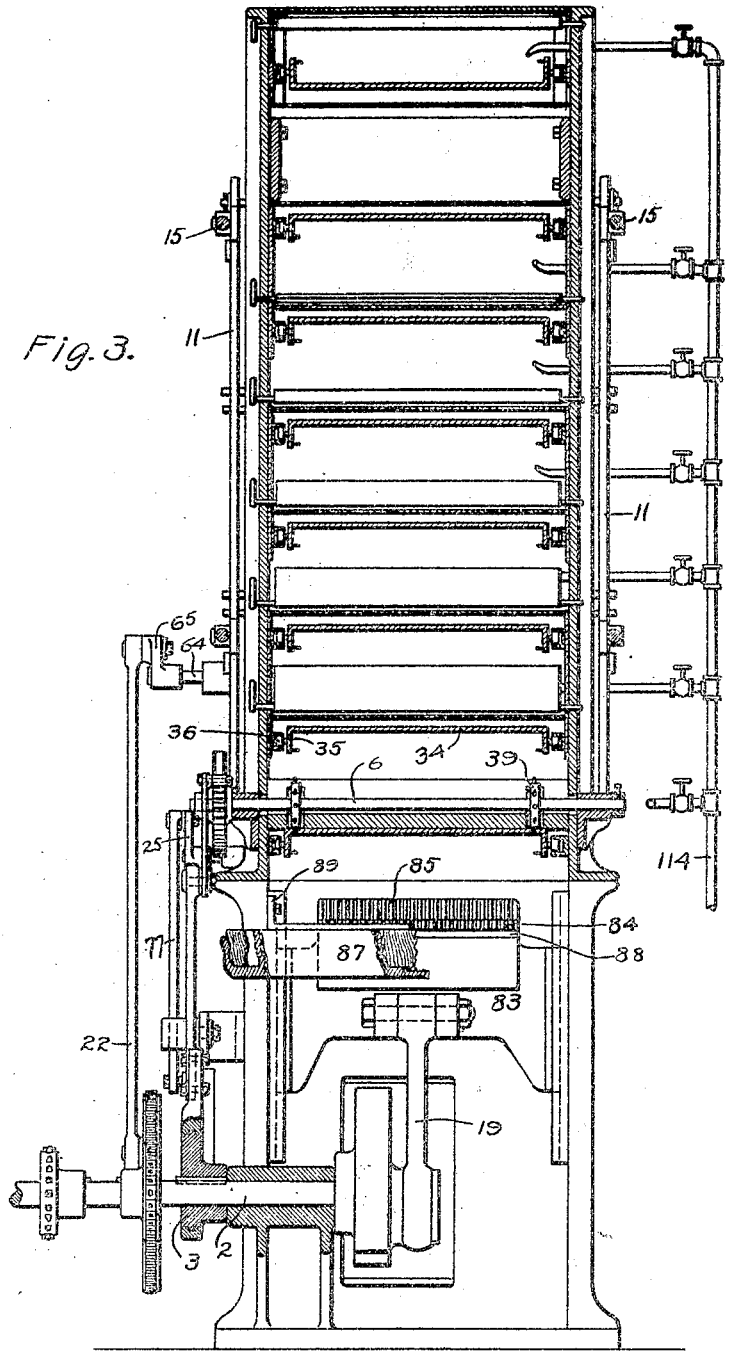

In the accompanying drawings, which illustrate one embodiment of my invention, Figure 1 is a side elevation of an automatic match-making machine. Fig. 2 is a transverse section through the combined feeding and index wheels and also the match-holders. Fig. 3 is an end view of the machine, partly in section. Fig. 4 is an enlarged detail view of one of the devices for transferring the match-holders from one track-section to another. Figs. 5 and 6 are detail views showing means for locking and unlocking the transfer device. Fig. 7 is a plan view of one of the holders, showing the holes for the match-sticks and the openings for the teeth on the index and feeding wheel. Fig. 8 is a detail view showing the arrangement of the partitions for forming the drying-chambers. Fig. 9 is a detail sectional view showing the means for discharging the finished matches from the holders and also the match-receiving hoppers. Fig. 10 is a view at right angles to that of Fig. 9 of the same mechanism. Figs. 11 and 12 are detail views of the paraffin-tank, showing the means employed to keep a constant level. Fig. 13 is a detail view of the match-box conveyer. Fig. 14 is a detail sectional view of a hopper looking into the end. Fig. 15 is a detail view of a stop for preventing the match-holders from rolling off of the carriages, and Fig. 16 is a detail view of a box-conveyer for the finished matches.

Referring to Fig. 1, 1 represents the framework of the machine, and mounted thereon in suitable bearings is the main driving-shaft 2. Mounted on the shaft is an eccentric 3 for actuating the ratchet-wheel 4 by means of the spring-pressed pawl 5, the said wheel being mounted on the shaft 6. The ratchet-wheel and pawl are so arranged that for every rotation of the main shaft the ratchet-wheel will advance one tooth. The pawl should have a slight amount of excess travel at the beginning of its working stroke to insure the proper operation. The shaft 6 is employed for actuating the feeding and index wheels, which regulate the movements of the match-holders, as will appear hereinafter. To the right of the main shaft and connected thereto by a sprocket-chain is a counter-shaft 7. On the counter-shaft is a pinion-gear which transmits motion to the secondary shaft 8 through speed-reducing gearing. The gear on the secondary shaft is provided with a wrist-pin, to which is connected the rod 9. This rod has a relatively slow movement and is employed to actuate the devices which transfer the match-holders from one track-section to another. The upper end of the rod is connected to a bell-crank lever 10, and the latter is connected by the rod 11 with a similar bell-crank lever 12. Situated on opposite sides of said lever and moved thereby are slotted plates 13 and 14, which form actuators for the transfer devices. Motion from the bell-crank levers to the actuators is imparted by the parallel rods 15. It will readily be seen that the rods 15 form a parallel-motion connection for the actuators 13 and 14. Each of the actuators is provided with a roller 16 at its upper end that moves back and forth on a suitable guide. Similar rollers and guides are located on the opposite side of the machine, also bell-crank levers and connecting-rods. The arrangement of parts is such that the actuators 13 and 14 move simultaneously away from and toward each other. At the right of the bell-crank levers is a gear 17, driven by the match-holders, which drives the gear 18, mounted on the composition or ignition-paste-roll. Mounted on the main shaft 2 between the side frames is a crank 19, that operates the cutters. Situated at the left of the main shaft and mounted on a counter-shaft 20 is a sprocket-wheel 21, the latter being connected to a sprocket on the main shaft and revolving at half the speed. On the sprocket-wheel 21 is a wrist-pin for the crank 22, which actuates the means for forcing the finished matches out of the holders. Two rows of matches are forced out at a time, while only a single row is inserted. Hence the speed reduction between the main and counter shaft. Owing to this difference in feed, a slight separation between the holders is necessary, and to insure the proper feeding of the holders to receive the matches the portion of the track 23 is given a decided downward slant. Mounted on the secondary shaft 20 is a cam 24, which has two idle and two active portions, each active portion covering about forty-five degrees. This cam is for the purpose of turning the row of match-receiving hoppers to the position of discharge and returning them to their normal position when empty. This action takes place once for every revolution of the shaft, and motion is transmitted by a connecting-rod and bell-crank lever 25. The machine is inclosed, except at one end, and is connected by a conduit 30 with the suction of an exhaust-fan to permit of a forced air circulation.

Referring now to Fig. 2, seven horizontally-extending track-sections 31 are provided, each section comprising two channel-bars, Fig. 4, affixed to the uprights of the main frame. The track-sections are separated by horizontally-extending partitions 32, (shown in section,) so that each is located in an individual chamber. These chambers are open to atmosphere on the left and on the right communicate with the conduit 30. In each chamber is a damper or valve 33 to regulate the passage of air therethrough. The valves in the several chambers are set to permit increasing amounts of air to pass as the matches become drier and drier. Mounted upon and moving along the track-sections are match-holders comprising a perforated plate 34, having downwardly-extending sides 35, Figs. 3 and 7, to which rollers 36 are attached. These rollers extend into and engage with the sides of the channel-bars forming the track-sections. Each holder has a large number of match-receiving openings 37, arranged in rows, and orifices 38, which receive the teeth on the feeding and index wheels 39, Fig. 3. The term "feeding and index wheel" is used in its ordinary signification as the teeth thereon advance or feed the holders and also cause them to register with the discharging device and loading means. The holders are arranged to push each other along by end engagement, and the orifices 38 are so disposed that the pitch distance between orifices in adjacent holders is the same as between orifices in a given holder. Situated at the ends of the track-sections are transfer devices which transfer the holders from one section to the one next above it. These transfer devices are arranged in staggered relation—that is to say, the lowest one on the right-hand side transfers the holders from the lowest track-section to the one above, the second transfer device located on the left-hand side transfers the holders from the second to the third section, the third device located on the right transfers the holders from the third section to the fourth, and so on. The construction of these devices is best shown in Fig. 4. Extending laterally from the uprights of the main frame of the machine are plates 40, located on opposite sides of the holders and provided with short pieces of channel-bar 41, similar to the track-sections, but inclined thereto. Pivotally supported by the plates are short pieces of channel-bar stock-forming carriages 42. On the end of the bar or carriage adjacent to the pivot is a projection 43, which is adapted to be engaged by the sliding member 44 of the actuator when moved to the extreme right. This causes the left-hand end of the part 42 to be swung upward until it registers with the stationary and inclined portion 41 of the track. In order to temporarily hold the part 42 in its raised position, a latch 45 is provided having an end like the latch on a door. This will yield when the part 42 moves upward, but has to be moved positively to permit it to move downward. The unlocking or releasing arrangement is shown in Figs. 5 and 6. 45 represents the latch, which projects through the side plate 40 and is suitably guided. Mounted in a bracket on the plate is an arm 117, which normally holds the latch in working position by reason of the torsion-spring 46. On the upper end of the same pivot which supports the arm is a second arm 47, carrying a pin at its end which is engaged by the finger or projection 48 on the member 44 of the actuator when the latter is moved to the left, as shown in Figs. 5 and 6. This movement increases the torsion on the spring 46, which moves the latch inward as soon as released. All of the transfer devices are similar in construction.

The action of each transfer device is as follows: Assuming the parts to be in the position shown and that a given match-holder $34^a$ is moved upon the pivoted piece 42 by reason of the actuator 14, Fig. 1, sliding the members 44 and 50 along the inclined guides 51 and 52. This transmits motion to the match-holder $34^a$. The spring-pressed dog 53 serves to definitely locate the position of the holder without, however, interfering with its onward movement. As the members 44 and 50 move to the right the holder $34^a$ does likewise until the part 54 engages the projection 43 and moves the part 42 or carriage about its pivot. As soon as it passes the latch 45 it is held in the raised position, even though the actuator and members 44 and 50 start on their return movement. On the member 44 is a spring-pressed dog 55, that engages the holder while still on the carriage 42, and as it moves to the left, due to the bell-crank levers 10 and 12, Fig. 1, the holder moves with it. As soon as it moves off of the carriage the finger 48 engages the pin on the arm 47, which rocks its supporting-spindle and withdraws the latch 45 and permits the carriage 42 to drop back to the position shown. A gravity-actuated dog $55^b$ retains the successive holders in place while the actuator moves to the right and picks up another holder. The same action takes place with each of the transfer devices, and it is thought that further description on this point is unnecessary.

After the holders have been moved forward and backward over the track-sections until they reach the top of the machine or the bottom in case the general direction of movement is from the top to the bottom they are taken by a conveyer $55^a$ back to the point of starting. The conveyer is made of channel-stock of the same size as the track-sections and the wheels or rollers on the match-holders engage therewith. It is curved backward at the right-hand end and after passing through a chamber 56, which is connected to the exhaust-conduit 30, is reversely curved, so that it discharges the holders into the lowest track-section ready to receive a new load of match-sticks. As the holders enter and pass along the conveyer the heads are turned upward; but this is not objectionable, because the matches have reached a stage where the heads are hardened. The holders after they reach the highest part of the conveyer move along under the action of gravity, and thus decrease the driving power. It will be seen that the holders are continuously moved, except for the action of loading and unloading, in a definite cycle and that this movement is entirely automatic, thus dispensing with all manual labor.

At a point adjacent to the end of the conveyer a means is provided for discharging the matches from the holder. This is best seen in Figs. 1, 2, 9, and 10. 57, Fig. 1, represents a shaft upon which the feeding and index wheels 39 are mounted. Rigidly mounted on the same shaft is a ratchet-wheel 58, which is advanced step by step by the pawl 59, the latter being mounted on an arm 60, which is loosely journaled on the shaft 57. In order to push the matches out of the holders, a cross-head 61 is provided which slides in vertical guides 62, located on opposite sides of the machine. On the lower end of the cross-head are two rows of pins 63, whose pitch corresponds with the match-receiving holes in the holders. In order to impart vertical movements to the cross-head, a transverse rock-shaft 64 is provided, having suitable bearings located in uprights at opposite sides of the machine-frame. To this shaft is secured an arm 65. (Shown in full lines in Fig. 1 and in dotted lines in Fig. 9.) This arm is connected by the rod 22 with a wrist-pin on the sprocket-wheel 21, Fig. 1, and as the latter slowly rotates the shaft is rocked to and fro. Rigidly mounted on the rock-shaft, Figs. 9 and 10, are two arms 66 and 67, having well-rounded ends which enter slots in the cross-head and move it up and down once for each movement of the rock-shaft. Attached to the cross-head is a bracket 68, the outer end of which is connected by a link 69 to the pawl-carrying arm 60. As the cross-head is depressed to force out the matches the pawl 59 rides over one and a fraction teeth on the ratchet-wheel. On the upward stroke the pawl engages the ratchet-wheel and advances it the distance of one tooth. It is necessary to have a slight amount of lost motion between the pawl and the ratchet-teeth, so that the feeding and index wheels which are operated thereby will not tend to feed the holders along until the pins 63 are withdrawn.

Situated below the match-discharging devices and extending across the machine is a row of match-receiving hoppers $69^a$ of novel construction. These hoppers are pivotally supported on the transversely-extending spindle 70, the latter being mounted in bearings on the side frames of the machine. The hoppers are provided with outwardly-flaring ends and projections just below said flaring ends, which act as a stop for preventing the matches from being thrown out by centrifugal force as each hopper is rotated about its support. The hoppers are affixed to a common support and each is provided with an outwardly-flaring upper end and a pivoted door 71. Each of these doors is mounted on a spindle 72, having suitable bearings and a crank 73. The upper ends of the cranks extend through a perforated actuator 74, which is capable of a slight longitudinal movement when it is desired to open the doors and discharge the matches. This longitudinal movement is accomplished by a cam 75, which describes an arc of a circle. The end of the actuator adjacent to the cam is provided with an antifriction-roller engaging the cam, while the opposite end is provided with an extension-spring 76, which urges the roller against the cam. The spindle to which the hoppers are attached is rocked by the lever 25, Fig. 1, the lever being attached to a suitably-guided rod 77, which carries a roller working in the rotary cam 24. The hoppers are rocked to a position ninety degrees from the one shown each time the counter-shaft 20 rotates, and each time the hoppers assume this position the doors 71 are positively opened to discharge the matches into the boxes 78, located directly underneath and carried by the belt conveyer 79. As the spindle and hoppers return to their normal position the doors of the hoppers are positively closed by reason of the roller on the actuator 74 riding up the inclined surface of the cam. The belt conveyer may be moved manually or by a suitable slow and intermittently-acting source of power. The boxes are held in place on the conveyer, Fig. 13, by spring-clips 80, one clip sufficing to engage the adjacent ends of two boxes.

In order to support the holders while the matches are being discharged, an apron 116 is provided, which has a series of projections that extend between the matches. The apron is provided with arms or brackets at the ends, which are bolted to the side frames of the machine, as shown in Fig. 10. At 81 are shown the pins which engage with the gravity-actuated dogs 55 of Fig. 4.

After the matches have all been pushed out of a holder and the latter has been moved along by a loaded holder it reaches the incline 23, Figs. 1 and 2, and slides down until it strikes another holder, held in position by the index and feeding wheels 82, Fig. 2, mounted on the low-speed shaft 6, which is driven by the ratchet-wheel 4 and the pawl 5, Fig. 1. Situated below the index and feeding wheels 82 is the cutting device for making the match-sticks and inserting them in the holders 34. This comprises a cross-head 83, moved vertically in suitable guides by the crank 19, driven by the main shaft. The crank and attached parts are suitably counterweighted. 84 represents the cutters, which are fastened to the upper surface of the cross-head, and situated above them is a plate 85, that holds the cutters in place and is provided with openings or slots for guiding the match-sticks. I may use a cutter comprising a plurality of individual knives or cutters, which are held against endwise movement by pins 86, or a cutter of other suitable form. The blocks of wood from which the matches are formed are fed along the bed or table 87 by suitable means. (Not shown.) The cutters act on the downward stroke of the cross-head, and on the upward stroke the match-sticks are forced into the openings in the holders by means of a butting-block 88. The butting-block is moved horizontally to the right by suitable means after the cutters have formed the sticks. The object of this arrangement is to form a firm abutment for forcing the sticks into the holders on the upward stroke of the cross-head. Situated in front of the ends of the cutters and on top of the block of wood being cut is a clamping-plate 89. For each complete revolution of the main shaft a row of match-sticks is formed and inserted in a holder. After this action takes place the cross-head starts downward, and as soon as the guide-plate 85 clears the match-sticks the index-wheels are advanced one tooth by the ratchet-wheel 4 and pawl 5, Fig. 1, which also advances the holder preparatory to receiving another row of sticks. This action is continuously repeated.

After the holders are loaded with sticks, the latter being omitted for the sake of clearness in the main figures, they are passed over a heating-table 90, containing heating-coils or an electric heater, as desired. This heats the ends of the sticks preparatory to receiving the paraffin. From the heating-table the sticks are dipped into a paraffin-bath contained in a tank 91, having steam-heating coils or an electric heater to maintain the paraffin at a given temperature. From the paraffin-bath the sticks are moved along to and over the composition-roller 92, which applies the necessary composition or ignition paste contained in the tank 93. The roller is driven by the gears 17 and 18, Fig. 1, the former being mounted on a shaft 94, which carries a toothed wheel 95, the teeth registering with the orifices 38, Fig. 7, in the holders 34 for the index and feeding wheels.

In Fig. 8 the arrangement of the means for preventing fire from working from one chamber to another is shown. 32 represents one of the horizontal partitions, which is supported by a side beam 95 of the machine-frame, forming a cross in cross-section. The sides of the chambers are formed by removable doors 96, which are held by the lugs 97 at the bottom and by pins 98 at the top, which extend through the frame-bars. (See also Fig. 1.) By means of this construction no spaces are afforded at the side supports permitting fire to creep from one corner of a chamber into another, and the sides can readily be taken down and replaced. It will thus be seen that the frame bars or beams 95 are +-shaped in section, with the horizontal webs supporting the partitions between the chambers and the vertical webs the removable doors.

In Figs. 11 and 12 is shown a means for maintaining a constant level in the paraffin or other tank. Two tanks 100 and 101 are shown, the former being the constant-level tank and the latter the supply-tank. The tanks may be made separately or cast in a single piece, as shown. The upper tank is provided with a dam 102, located at a predetermined height. Any excess fluid will flow over this dam and be returned to the supply-tank. On the right-hand side the upper tank is provided with a grooved depression 103 extending in the same direction as the track-sections, through which one of the side portions 35 of the match-holders is free to pass. On the right-hand side of the tanks and extending into the lower one is a pivotally-supported dipper 104. This dipper is carried by a vertically-extending arm 105, Figs. 1, 11, and 12, and the latter is pivoted at 106 to a suitable support. The upper end of the arm is attached to a suitable actuator—such, for example, as the actuator 14, Fig. 1—by a rod 107. By means of this construction the dipper will be given a slow up-and-down movement. In order to tilt the dipper and cause it to discharge its contents into the upper tank, the handle of the dipper is swiveled in a holder 108, which is attached to the arm 105. The handle is provided with a pin or projection 109, that engages with a lip 110 on the tank each time the dipper is raised, which causes the latter to be tilted to discharge its contents. The dipper can with advantage turn about forty-five degrees each time it is raised. Fastened to the end of the handle is a weight 111, which returns the dipper to its normal position preparatory to being refilled. By making the lower tank of greater length than the upper the spill from the dam and that from the dipper is caught, and in this manner waste is prevented. The danger from fire is also less because the paraffin cannot spread over the floor. Steam is admitted to the upper tank from the valved pipe 112 and to the lower tank by the valved pipe 113. By means of this the temperature in the two tanks can be regulated. These pipes may be connected to the main 114, Fig. 3, which supplies the steam-jets for putting out fires.

In Fig. 14 is shown a sectional detail view looking into a hopper after it has been rocked to a horizontal position by the spindle 70, Fig. 9. The door 71 is hinged on the left-hand side and instead of extending parallel with the wall above it is inclined thereto at a considerable angle. This is a desirable arrangement because the matches tend to collect in the right-hand end and arrange themselves in parallel relation and also because the door does not have to move so far to let the matches out as it would if it were parallel to the wall. The less the door has to open, the less time is required for the hoppers to discharge their loads. The hoppers are made of thin sheet metal, and the door should be made light and so hinged that it can freely swing back and forth at the proper times. The motions of the hoppers and doors are slow, which prevents the matches from bounding and becoming displaced when discharged by the holders. The use of independent transfer devices is advantageous, because each can be individually adjusted to register with the different track-sections. Owing to the fact that the holders are supported by rollers, they will readily pass from one section to another. The only places requiring fairly accurate relation of parts are where the feeding and index wheels engage the holders, and obviously this is a very small part of the whole.

In Figs. 4 and 15 is shown a stop 115, that is bolted to the side plate 40 for preventing the match-holders from rolling off of the carriage 42 for any cause during their transfer from one track-section to another.

In Fig. 16 is shown a detail view of a modified form of box-conveyer, arranged to move longitudinally of the machine instead of transversely, as previously described. With this arrangement an operator can stand at the end of the machine and take off loaded boxes and substitute empty ones with great facility. The boxes 78 are mounted on a suitable belt conveyer, which extends underneath all of the hoppers 69. In dotted lines is shown the position that a hopper takes when it is swung around its pivotal support 70. The boxes are secured to the conveyers by spring-clips 80, and the belt is mounted for movement on two drums, one of which is shown. The drum is carried by the shaft 118, which is driven by the toothed wheel 119. This wheel is driven by a single toothed wheel 121, mounted on the shaft 120 and driven by the belt 122 from a suitable shaft, such as the main shaft of the machine. The pitch of the teeth on the wheel 119 and the arrangement of the teeth on wheel 121 is such that for every revolution of the latter the conveyer will be advanced an amount sufficient to bring an empty box under the hopper. In other words, the conveyer advances the boxes step by step, while the driving element is in continuous operation.

While I consider it best to transfer the match-holders one by one from one track-section to another, two or even more holders may be transferred at a time by making the carriages and other parts longer.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. In a machine of the character described, the combination of a plurality of match-holders, a plurality of track-sections over which the holders are moved, vibrating and swinging supports for transferring the holders from one track-section to another, and a conveyer which receives the holders after they leave the last track-section and automatically conveys them to the beginning of the first section.

2. In a machine of the character described, the combination of a plurality of match-holders, a plurality of track-sections over which the holders are moved, vibrating and swinging supports for transferring the holders from one track-section to another, and a plurality of independent chambers through which the track-sections extend for drying or curing the matches.

3. In a machine of the character described, the combination of a plurality of match-holders, a plurality of track-sections over which the holders are moved, means for transferring the holders from one track-section to another, independent chambers arranged in parallel relation through which the track-sections extend for drying or curing the matches, means common to the chambers for forcing a drying medium through them, and devices in the different chambers for regulating the amount of the drying medium passing through them.

4. In a machine of the character described, the combination of a plurality of match-holders, a plurality of track-sections over which the holders are moved, independent pivoted and vibrating transfer-supports located at the ends of the track-sections and in staggered relation for transferring the holders from one track-section to another, and means for moving the transfer devices.

5. In a machine of the character described, the combination of a plurality of match-holders, a plurality of track-sections over which the holders are moved, a plurality of independent pivotally-supported and vibrating transfer devices located at the ends of each two adjacent sections for transferring the holders from one section to another, and an actuator for each of the transfer devices located at the ends of the track-sections.

6. In a machine of the character described, the combination of a plurality of match-holders, a plurality of track-sections over which the holders are moved, a plurality of independent pivotally-supported and vibrating transfer devices located at the ends of the two sections for transferring the holders from one section to another, an actuator for the transfer devices located at each end of the track-sections, and a driving means common to the actuators.

7. In a machine of the character described, the combination of a plurality of match-holders, a plurality of relatively short track-sections extending in the same general direction, a transfer device for each pair of track-sections, each of said devices comprising a pivotally-supported carriage adapted to receive the holders one at a time and transfer them from one section to another, and a means for rocking each of the carriages about its support to and from one track-section of its pair to the other.

8. In a machine of the character described, the combination of a plurality of match-holders, a plurality of track-sections located one above the other, pivotally supported and vibrating transfer-supports located adjacent to the ends of the pairs of track-sections for transferring the holders from one section to another, means for simultaneously operating all of the transfer devices, and a conveyer which conveys the holders from the upper track-section to the lowest.

9. In a machine of the character described, the combination of a plurality of match-holders, a plurality of relatively short track-sections over which the holders are adapted to move, pivoted and vibrating means located at the ends of the sections for transferring the holders from one to another, a stationary conveyer which receives the holders after they leave the last track-section and automatically conveys them to the beginning of the first section, a device located in the path of the conveyer for discharging the matches from the holders, and a driving mechanism which moves the holders over the track-section and into the conveyer and actuates the match-discharging means.

10. In a machine of the character described, the combination of a plurality of match-holders, a plurality of relatively short track-sections over which the holders are adapted to move, pivoted and vibrating means located at the ends of the sections for transferring the holders from one to another, a stationary conveyer which receives the holders after they leave the last track-section and automatically conveys them to the beginning of the first section, a device located in the path of the conveyer for discharging the matches from the holders, a means located between the said device and the beginning of the first section for reloading the holders, and a driving mechanism which is common to the holders, the discharging device and the reloading means.

11. In a machine of the character described, the combination of track-sections with a device for transferring match-holders from one section to another, the said device comprising a pivotally-supported and vibrating carriage, guides thereon to retain the holder in place while being transferred from one section to another, a projection on the carriage for moving it, and an actuator which engages the projection and swings the carriage about its pivot.

12. In a machine of the character described, the combination of separate track-sections, with a device for transferring match-holders from one section to another, comprising a pivotally-supported carriage, a latch for holding the carriage in a raised position until the holder is discharged, and a means for swinging the carriage about its support and for moving the latch to release the carriage after the holder has moved off of it.

13. In a machine of the character described, the combination of separate track-sections, with a device for transferring the match-holders from one section to another, comprising a pivotally-supported carriage having a track thereon to receive the holders, an actuator for swinging the carriage about its pivot to transfer the holders from one track to another, and a means movable with the actuator which engages the holders and moves them forward.

14. In a machine of the character described, the combination of separate track-sections, with a device for transferring the match-holders from one section to another, comprising a pivotally-supported carriage having a track thereon to receive the holders, an actuator for swinging the carriage about its pivot to transfer the holders from one track to another, a means movable with the actuator which engages the holders and moves them forward, and a means which retains one holder while the actuator returns for another holder.

15. In a machine of the character described, the combination of separate track-sections, with a device for transferring match-holders from one section to another comprising short pieces of track inclined to the sections, movable members which slide to and fro, a carriage which is pivotally supported between the ends of the adjacent pieces of track, a means for swinging the carriage about its pivot, and means for first moving the holders toward and then away from the point of support of the carriage.

16. In a machine of the character described, the combination of separate track-sections with a device for transferring match-holders from one section to another, comprising a pivotally-supported carriage, a means for vibrating the carriage about its pivot, means which first move a holder upon the carriage and then move it off, a device for holding the carriage in one of its positions until the match-holder has been moved, and releasing mechanism for the said device which is actuated by the holder-moving means.

17. In a machine of the character described, the combination of a plurality of relatively short independent track-sections, match-holders that move over the sections in end-to-end contact and are provided with feeding orifices, pivoted and vibrating supports for transferring the holders from one section to another, and means for positively urging the holders along the track-sections, comprising toothed wheels, the teeth of the wheels entering the orifices in the holders.

18. In a machine of the character described, the combination of perforated match-holders, a plurality of closely-associated pivoted hoppers for receiving the finished matches and discharging them into boxes, swinging doors for the hoppers which are inclined to the walls thereof to cause the matches to aline and also to give quick opening, and means for turning the hoppers on their support and opening all of the doors of the hoppers.

19. In a machine of the character described, the combination of a perforated match-holder, a pivotally-supported hopper located under the holder to receive the finished matches, a swinging door for the hopper through which the matches are discharged, the said door being arranged at an angle to the opposite wall of the hopper to cause the matches to collect at one place and to give a quick opening, and means for swinging the hopper about its pivot and opening the door.

20. A match-making machine comprising perforated match-holders, a plurality of closely-associated pivoted hoppers for receiving the finished matches and discharging them into boxes, swinging doors for the hoppers which are inclined to the walls thereof to collect the matches and open quickly, means for turning the hoppers and their support and opening all of the doors of the hoppers, a conveyer for carrying the match-receiving boxes which is located below the hoppers, and a driving means for advancing the conveyer step by step.

21. In a machine of the character described, the combination of a double tank containing material in a fluid state for treating the match-sticks, a dam in the upper tank for determining the level of the fluid therein, a dipper carried by a pivoted arm for conveying fluid from the lower to the upper tank in excess of that required, a lever for raising the arm and dipper, and a means for moving the arm about its longitudinal axis to empty the contents of the dipper.

22. A match-making machine comprising a plurality of track-sections, holders for the matches arranged to move over the sections, thin partitions for separating the sections and forming chambers one above the other, and supports for the partitions of + shape in section and located at their intersections, to prevent fire from working from one compartment into another.

23. A match-making machine comprising a plurality of track-sections, holders for the matches arranged to move over the sections, a framework for supporting the track-sections comprising + bars, horizontal partitions secured to the inside horizontal webs of the frame-bars, and vertically-disposed removable doors that are secured to the outside of the vertically-disposed webs.

24. In a machine of the character described, the combination of a plurality of track-sections over which the match-holders pass while the matches are being dried, independent chambers for the track-sections, means for supplying drying-currents to the chambers, and means for successively proportioning the strength of the current to the progressive state of the match-heads as to dryness and hardness.

25. In a machine of the character described, the combination of holders for the match-sticks, a plurality of track-sections arranged one above the other over which the holders pass as the matches dry, independent and pivotally-supported devices for transferring the holders from one section to another, parallel-motion actuators, and means for changing the parallel motion of the actuators to vibrating motion of the transfer devices.

26. A match-making machine comprising a pair of track-sections which are inclined toward each other at the ends, a vibrating support or carriage pivotally supported between said sections, holders for the matches, means causing the holders to move onto the carriages one after the other, a device for vibrating the carriage from one track-section to the other, and means for causing the holders to be discharged one after the other from the carriage.

27. A match-making machine comprising track-sections arranged in a pair, match-holders moving over the sections, a pivotally-supported and vibrating carriage for transferring the match-holders from one section to the other, a means for vibrating the carriage from one section to the other, a latch for retaining the carriage in one of its positions until a holder has made its movement, and a means for releasing the latch when it is desired to move the carriage.

28. A match-making machine comprising a plurality of track-sections, match-holders thereon arranged in end-to-end contact, rollers on the holders arranged to engage with and move over the sections, pivotally-supported vibrating carriages for shifting the holders from one section to another, and a means for vibrating the carriages to shift the holders from one track-section to another.

29. A match-making machine comprising a plurality of straight track-sections, match-holders carried by the sections and arranged in end-to-end contact, pivotally-supported vibrating carriages for transferring the holders from one section to another, a conveyer having curved receiving and discharge portions which receives the holders from the last track-section and conveys them to the first, the holders passing over the conveyer in end-to-end relation with the match-heads extending outwardly so that those on one holder will not strike those on another, and a means for vibrating the carriages and advancing the holders along the track-section and conveyer.

In witness whereof I have hereunto set my hand this 17th day of March, 1905.

GEORGE P. LOOMIS.

Witnesses:
EDWARD WILLIAMS, Jr..
W. GEORGE RUSS.